(12) United States Patent
Kumagai

(10) Patent No.: US 12,450,971 B2
(45) Date of Patent: Oct. 21, 2025

(54) CONTROL APPARATUS

(71) Applicant: Brother Kogyo Kabushiki Kaisha, Nagoya (JP)

(72) Inventor: Yosuke Kumagai, Owariasahi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 24 days.

(21) Appl. No.: 18/397,863

(22) Filed: Dec. 27, 2023

(65) Prior Publication Data
US 2024/0212414 A1    Jun. 27, 2024

(30) Foreign Application Priority Data

Dec. 27, 2022 (JP) ................................ 2022-210650

(51) Int. Cl.
*G07F 9/10* (2006.01)

(52) U.S. Cl.
CPC ..................................... *G07F 9/10* (2013.01)

(58) Field of Classification Search
CPC ........ G04F 9/10; F24F 13/28; B01D 46/0004; B01D 46/0005; H05K 7/20181; H05K 5/0221
USPC ........................................................ 312/35
See application file for complete search history.

(56) References Cited

U.S. PATENT DOCUMENTS

| | | | | |
|---|---|---|---|---|
| 2,575,499 A * | 11/1951 | Manow | .................. | F24F 13/28 55/506 |
| 3,570,220 A * | 3/1971 | Felter | ..................... | B01D 46/10 55/385.7 |
| 5,114,448 A * | 5/1992 | Bartilson | ............... | B01D 46/10 55/497 |
| 5,766,285 A * | 6/1998 | Killman | ............. | B01D 46/0016 55/501 |
| 6,007,169 A | 12/1999 | Li et al. | | |
| 6,425,945 B1 * | 7/2002 | Cheng | ..................... | F24F 3/044 55/483 |
| 7,077,893 B2 * | 7/2006 | Guilliard | ............ | H05K 7/20181 96/414 |
| 7,604,127 B2 * | 10/2009 | Freissle | ..................... | B07B 1/46 209/412 |
| 8,747,505 B2 * | 6/2014 | Crabtree | .............. | B01D 46/001 55/482 |
| 9,039,500 B2 * | 5/2015 | Pfannenberg | ...... | H05K 7/20181 454/309 |

(Continued)

FOREIGN PATENT DOCUMENTS

| | | |
|---|---|---|
| JP | H02-105291 A | 4/1990 |
| JP | 2005-256393 A | 9/2005 |
| JP | 2006-052584 A | 2/2006 |

OTHER PUBLICATIONS

May 23, 2024—(EP) Extended EP Search Report—App. 23219675.8.

*Primary Examiner* — Eret C McNichols
(74) *Attorney, Agent, or Firm* — Banner & Witcoff, Ltd.

(57) ABSTRACT

A control apparatus includes a housing, a holding plate pivotable between a first state at which a first surface of the holding plate is close to the first panel and a second state at which the first surface is spaced apart from the first panel, and a locking member. The locking member includes a locking plate, a bush and a pin. The locking plate is pivotably supported so as to be pivotable about an opening of the engaging portion in a state in which the engaging portion is held between a collar portion of the bush and the first panel of the housing.

15 Claims, 5 Drawing Sheets

(56) References Cited

U.S. PATENT DOCUMENTS

| | | | |
|---|---|---|---|
| 9,237,674 B2* | 1/2016 | Hartmann | B01D 46/0005 |
| 9,587,664 B2* | 3/2017 | Bisset | F16B 39/26 |
| 10,549,226 B2* | 2/2020 | Cho | B01D 46/0006 |
| 11,965,674 B2* | 4/2024 | Park | F24F 13/28 |
| 12,313,284 B2* | 5/2025 | Pecchia | F24F 13/084 |
| 2004/0154242 A1* | 8/2004 | Hudoba | F16B 43/00 52/202 |
| 2008/0265723 A1 | 10/2008 | Kerrigan et al. | |
| 2010/0015904 A1 | 1/2010 | Yeh et al. | |
| 2017/0232373 A1* | 8/2017 | Chang | B01D 46/0005 55/467 |

* cited by examiner

CONTROL APPARATUS

REFERENCE TO RELATED APPLICATIONS

This application claims priority from Japanese Patent Application No. 2022-210650 filed on Dec. 27, 2022. The entire content of the priority application is incorporated herein by reference.

BACKGROUND ART

The present disclosure relates to a control apparatus configured to control an external device.

There is known a door locking apparatus of a vending machine. In a case where a heat-insulating door is opened, a hook portion of a locking member is outwardly moved against an elastic force of a spring member by grabbing an operation handle, and then the heat-insulating door is opened by releasing an engagement of the hook portion from an engaging member. In a case where an inner door is opened, the hook portion of the locking member is further outwardly moved and an engaging piece is removed from an engaging hole, then the inner door is opened.

SUMMARY

In a control apparatus configured to control an external device, there has been known a configuration including an air intake and an air vent for releasing heat from a heat source such as a power circuit and the like in the control apparatus, and a filter provided for an opening of the air intake and the air vent. In the control apparatus containing precision electronic circuits, the filter needs to be surely attached to the control apparatus without leaving clearance so that dust do not enter an inside of the control apparatus. On the other hand, it is preferred that the filter is configured to be easily replaced in a case where the filter becomes clogged. For example, the control apparatus can be configured that the control apparatus includes an openable door having a locking mechanism provided for a housing of the control apparatus, and the filter is replaced through the openable door.

However, in the door locking apparatus of the above described vending machine, since the lock is released by moving the hook portion of the locking member outwardly against the elastic force of the spring member, it is not possible to deal with problems of a configuration in which the lock is released by pivoting a locking plate of the locking member, specifically, it is hard to pivot the locking plate.

The present disclosure relates to a control apparatus capable of easily pivoting a locking plate when a lock of a locking member is released by pivoting the lock plate of the locking member.

In one aspect of the disclosure, a control apparatus includes a housing including a first panel in which an opening through which outside air is communicatable is formed, a holding plate provided to the first panel via a hinge and pivotable between a first state at which a first surface of the holding plate is close to the first panel and a second state at which the first surface is spaced apart from the first panel, and a locking member provided to the first panel and configured to keep the holding plate in the first state in a state in which the locking member is in contact with a second surface, which is opposite to the first surface, of the holding plate. The holding plate is configured so that a filter-accommodated space, defined by the first panel of the housing and the holding plate in the first state, is capable of accommodating a filter member attachably and detachably. The locking member includes a locking plate including an engaging portion in which an opening is formed and a contact portion contactable with the second surface of the holding plate, a bush including a tube portion having a through hole and inserted in the opening and a collar portion formed continued from the tube portion and contactable with a first surface of the engaging portion, the tube portion having a length larger than a thickness of the engaging portion of locking plate, the collar portion having an outside diameter larger than an outside diameter of the tube portion, and a pin including a shank passing through the through hole of the bush, a head formed at a first end of the shank and having an outside diameter larger than a diameter of the through hole and a fixer formed at a second end of the shank and fixed to the first panel of the housing. The locking plate is pivotably supported so as to be pivotable about the opening in a state in which the engaging portion is held between the collar portion of the bush and the first panel of the housing.

BRIEF DESCRIPTION OF DRAWINGS

The objects, features, advantages, and technical and industrial significance of the present invention will be better understood by reading the following detailed description of the embodiment of the invention, when considered in connection with the accompanying drawings, in which.

DESCRIPTION

Figure 1:
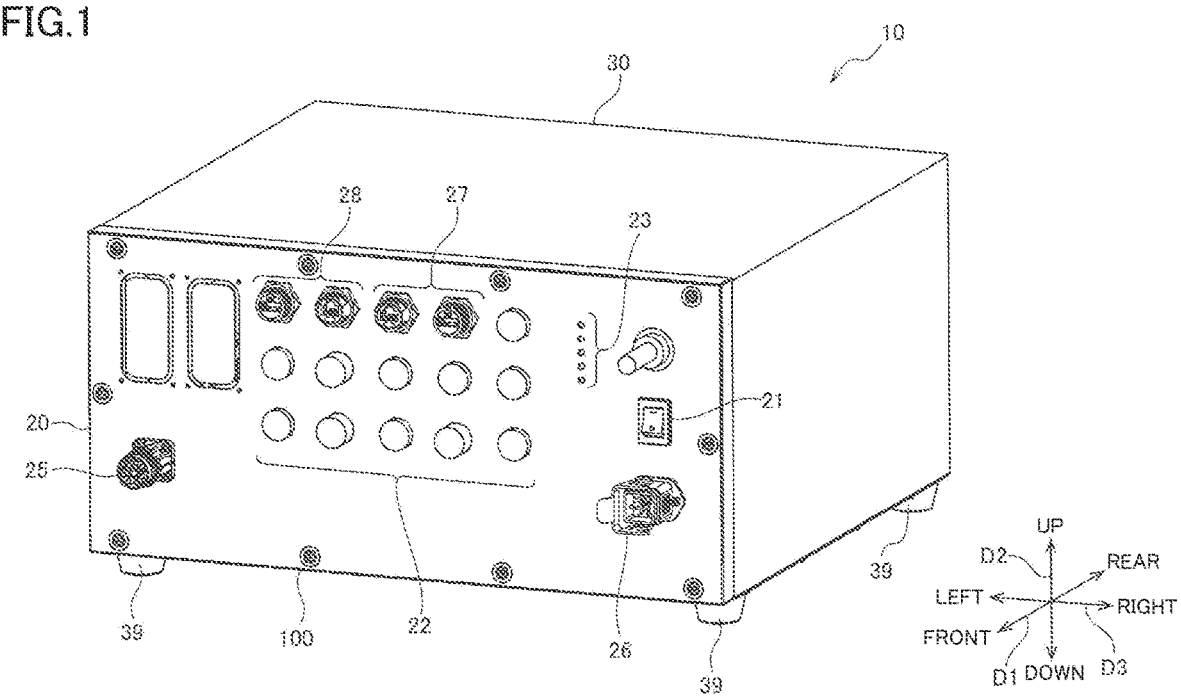
FIG. 1 is a perspective view of an external appearance of a control apparatus.

There will be described below an embodiment of the present disclosure in details with reference to drawings. In the drawings used by the following description, it may be dispensed with to draw a part of a main configuration, and the ratio among the drawn parts and the like are not necessarily accurate. In each of the drawings, a front and rear direction D1, an up and down direction D2 and a right and left direction D3 indicate corresponding directions illustrated in each of the drawings.

FIG. 1 illustrates an external appearance of a control apparatus 10 of a first embodiment of the present disclosure. The control apparatus 10 controls an external device. In the present embodiment, a laser head as the external device, not illustrated, having a laser emitter is connected to the control apparatus 10. The control apparatus 10 is configured to execute a marking process in which a two-dimensional scanning is performed on a processing surface of an object to be processed by controlling the laser head. The laser head is an example of a laser light outputting device.

As illustrated in FIG. 1, the control apparatus 10 includes an outer housing 30 which is shaped like a box and has an opening 30A on a front face thereof (see FIG. 3), and a panel 20 configured to cover the opening 30A. And, the panel 20 is screwed and fixed to the outer housing 30 by a plurality of screws 100. On the panel 20, a power switch 21, various kinds of connectors 22, a plurality of indicators 23 consisted of a plurality of LEDs (Light Emitting Diode), a terminal 25 to which a cable, not illustrated, connecting the laser head with the control apparatus 10 is connected, a terminal 26 to which a power cable, not illustrated, for supplying commercial power (for example, 100V) is connected, terminals 27 to which LAN (Local Area Network) cables, not illustrated, are connected, terminals 28 to which USB (Universal Serial Bus) cables, not illustrated, are connected, and the like are provided. That is, the panel 20 has a function of an operational panel.

Figure 2:
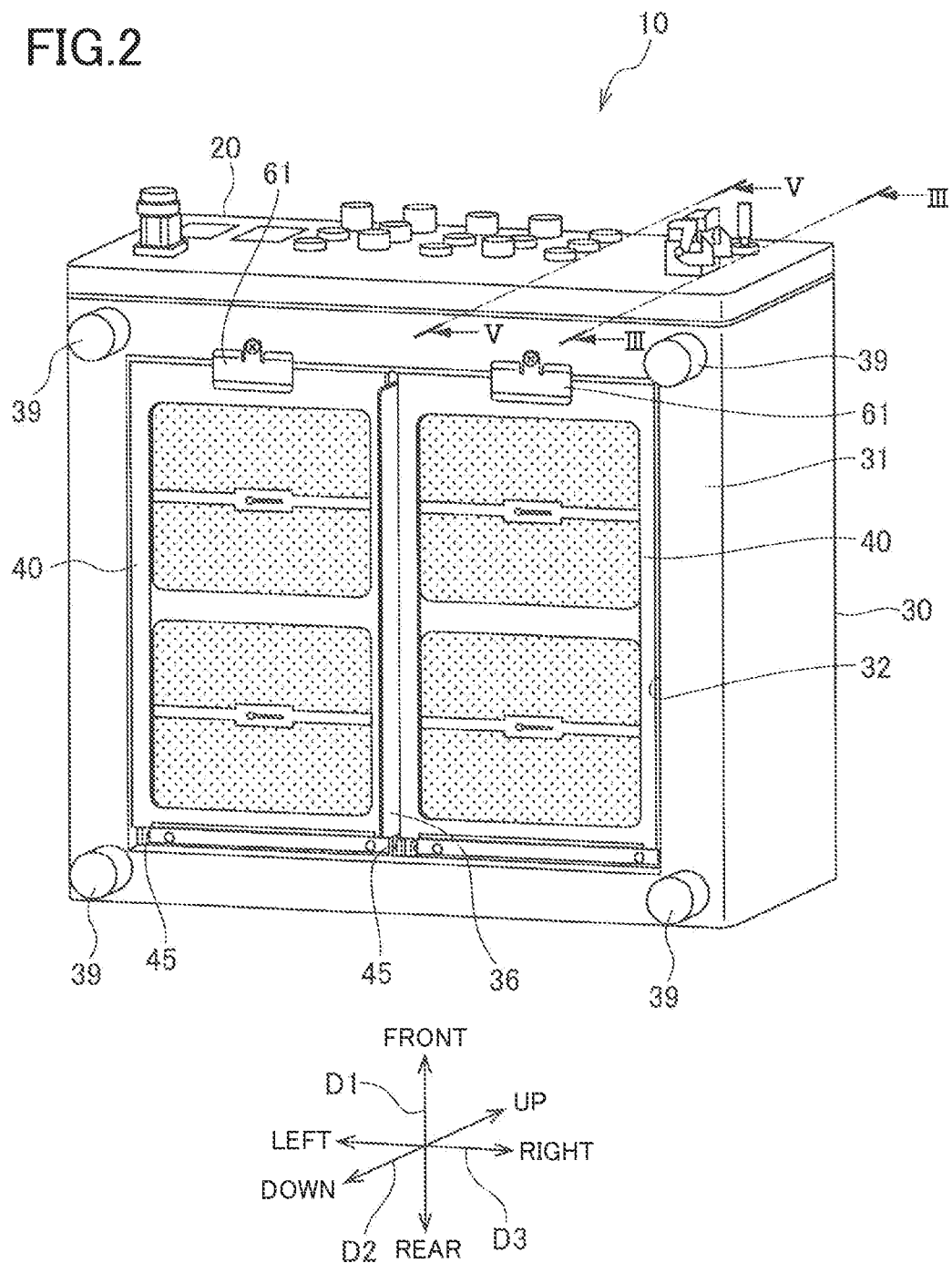
FIG. 2 is a perspective view of the control apparatus viewed from a bottom side.
Figure 3:
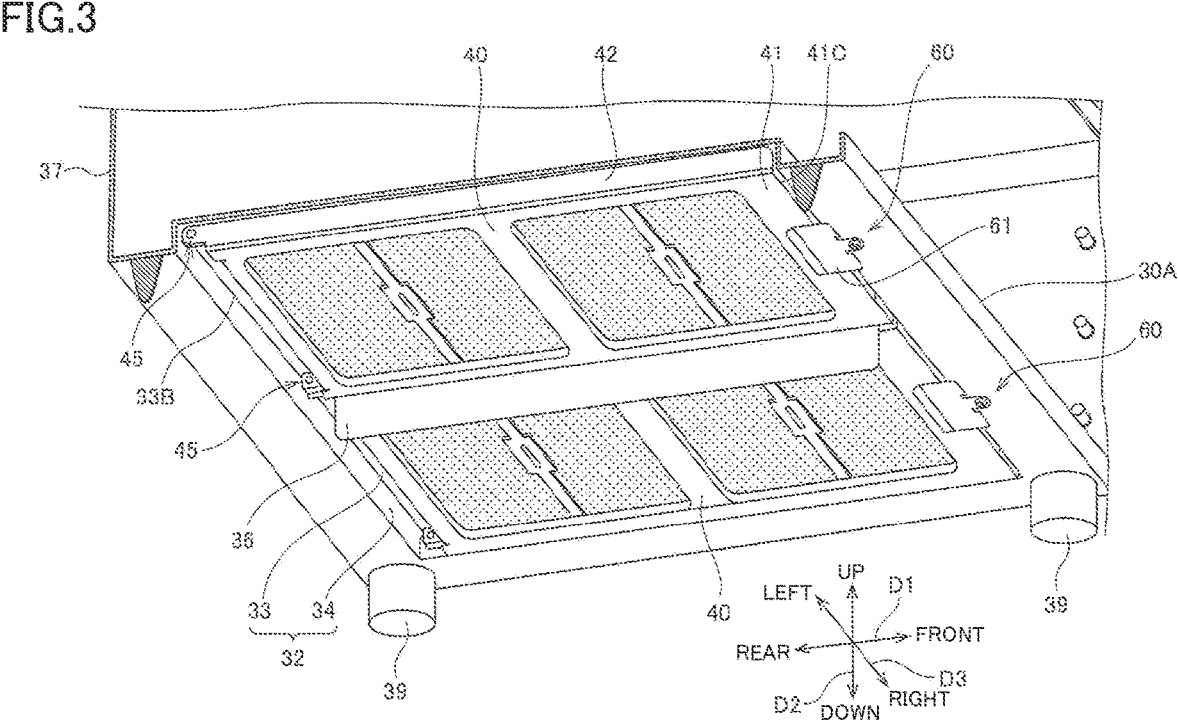
FIG. 3 is an enlarged perspective cross-sectional view taken along line III-III in FIG. 2.
Figure 4:
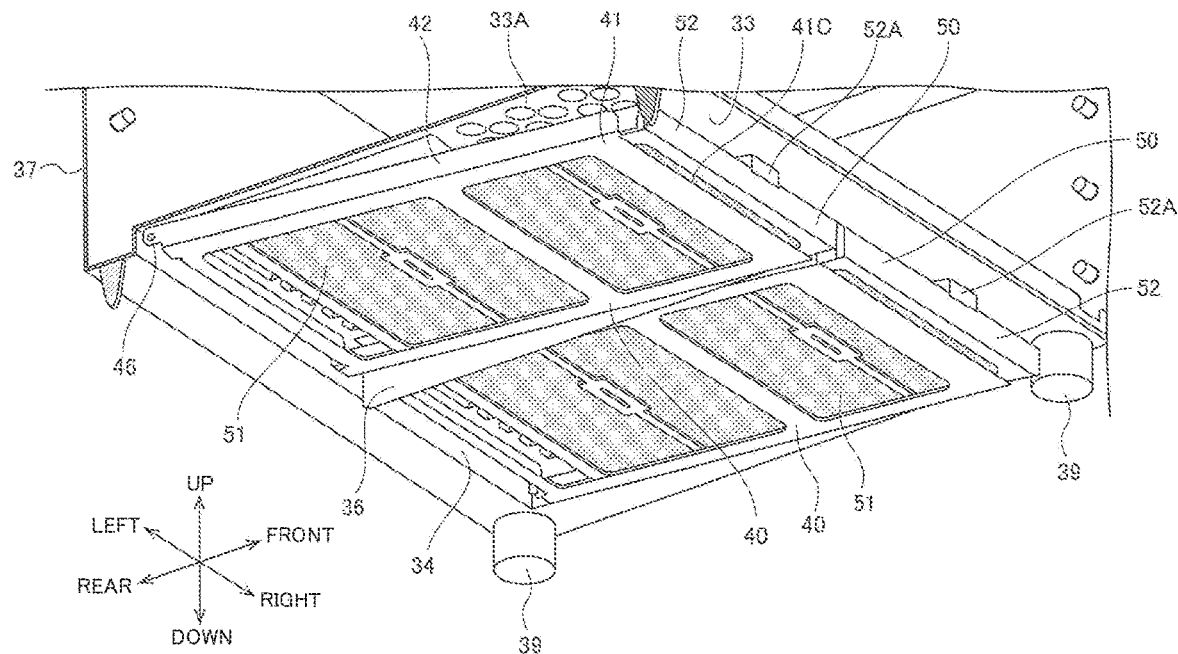
FIG. 4 is a view illustrating a state in which a lock of a metal plate is released from a state in FIG. 3.

As illustrated in FIG. 2, four leg portions 39 are provided on a bottom panel 31 of the outer housing 30, for example, at four corners thereof, and the four leg portions 39 are in contact with a placement surface of the control apparatus 10. A space of several centimeters is formed between the bottom panel 31 and the placement surface by the leg portions 39. Moreover, as illustrated in FIG. 3, a recessed portion 32 is formed so as to be recessed upward from the bottom panel 31 of the outer housing 30. The recessed portion 32 has a rectangular shape in plan view, and the recessed portion 32 includes a ceiling 33 and a surrounding wall 34 surrounding the ceiling 33. As illustrated in FIG. 4, a plurality of openings 33A are formed in the ceiling 33. The openings 33A enable air communication between outside air and inside air of the control apparatus 10. Various kinds of electronic parts including PSU (Power Supply Unit), not illustrated, are disposed in the inner side of the control apparatus 10 to control the laser head. And, the electronic parts generate heat during the laser head is controlled, and the inside of the control apparatus 10 becomes hot, so it is necessary to cool the inside of the control apparatus 10. Cooling is performed by, for example, a fan, not illustrated, provided in the inside of the control apparatus 10, and each of the openings 33A plays a role in dissipating the internally generated heat into the outside of the outer housing 30. In the present embodiment, each of the openings 33A located on a left side of a center of the bottom panel 31 functions as an air intake configured to take in outside air, and each of the openings 33A located on a right side of the center of the bottom panel 31 functions as a vent configured to release hot air in the outer housing 30 into the outside of the outer housing 30. Moreover, a wall 36 extending in the front and rear direction is formed at a central part of the bottom panel 31, and the wall 36 divides the bottom panel 31 into a left part and a right part. As a result of this, the wall 36 prevents the openings 33A located on the left side of the bottom panel 31 from directly taking in the released air from the opening 33A located on the right side of the bottom panel 31 so as not to reduce cooling efficiency. However, in order to prevent the entry of dust and lint into the inside of the control apparatus 10 from the openings 33A, a pair of filter members 50, 50 is disposed in the recessed portion 32, and the openings 33A are covered with the pair of filter members 50, 50.

As illustrated in FIG. 3, two pairs of hinges 45, 45 are disposed at a position close to a rear end portion 33B of the ceiling 33 of the recessed portion 32, that is, a position nearer to a rear panel 37 of the outer housing 30 of the bottom panel 31 than to the panel 20, in other words, a position located on a rear side of a center of the bottom panel 31 in the front and rear direction, the two pairs of hinges 45, 45 are arranged in the right and left direction, and a rear end of one holding plate 40 is attached in the recessed portion 32 via the pair of hinges 45, 45. As a result of this, the two holding plates 40 are respectively attached in the recessed portion 32 in a state in which the two holding plates 40 are arranged in the right and left direction. It is noted that each of the holding plates 40 has the same structure, effect and the like, so there will be described below only one of the holding plates 40, for example, the left side holding plate 40.

The holding plate 40 includes a bottom plate 41 in which openings each configured to expose a lower face of a filter 51, which will be described below, of the filter member 50 are formed, a left-side side wall 42 standing from a left end portion of the bottom plate 41, and a right-side side wall, not illustrated, standing from a right end portion of the bottom plate 41. A rear end of the holding plate 40, more specifically, rear ends of the left-side side wall 42 and the right-side side wall of the holding plate 40 are attached to a position close to the rear end portion 33B of the ceiling 33 of the recessed portion 32 via the pair of hinges 45, 45. As a result of this, as illustrated in FIG. 4, the holding plate 40 pivots about a rotational axis 46 of the pair of hinges 45, 45. The holding plate 40 pivots between a first state (see FIG. 3) at which a top surface 41A of the bottom plate 41 is close to the bottom panel 31 of the outer housing 30 in the up and down direction D2 and a second state (see FIG. 4) at which the top surface 41A of the bottom plate 41 of the holding plate 40 is spaced apart from the bottom panel 31 of the outer housing 30. And, a locking member 60 configured to lock the pivot of the holding plate 40 in order to keep the top surface 41A of the bottom plate 41 of the holding plate 40 in the first state is disposed at a position nearer to the panel 20 than a front end portion 41C of the bottom plate 41 of the holding plate 40 in the bottom panel 31. More specifically, the locking member 60 is attached to the bottom panel 31 of the outer housing 30 at a position nearer to the panel 20 than the front end portion 41C of the bottom plate 41 of the holding plate 40. The locking member 60 is configured such that the locking member 60 is contactable with the front end portion 41C of the bottom plate 41 of the holding plate 40.

Figure 5:
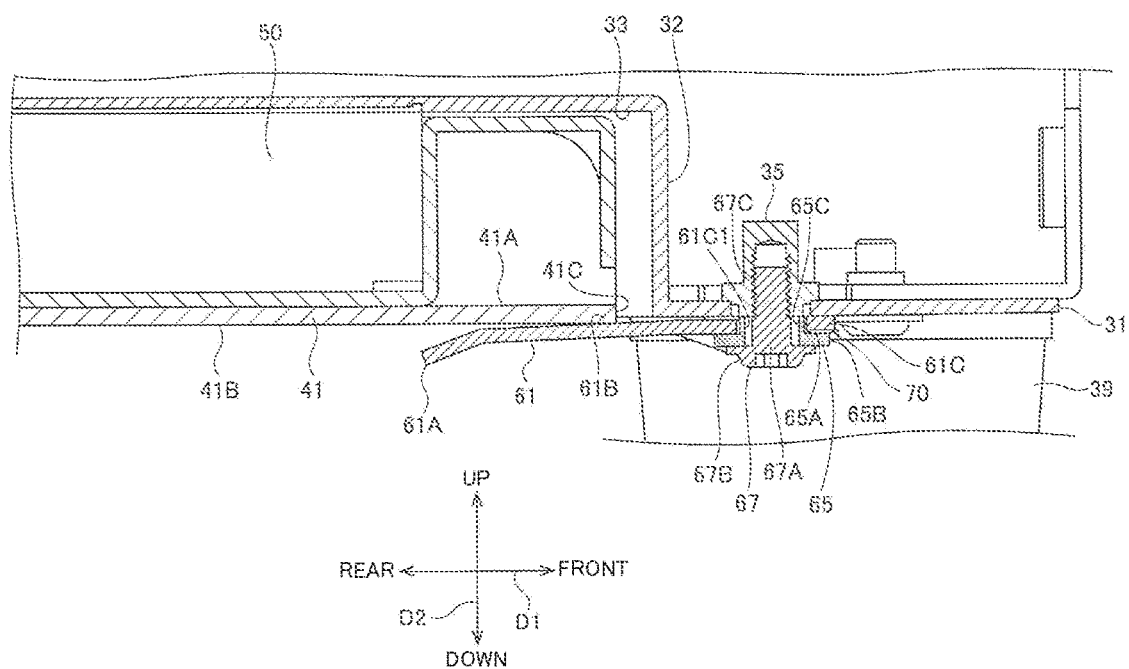
FIG. 5 is an enlarged perspective cross-sectional view taken along line V-V in FIG. 2.

As illustrated in FIG. 5, the locking member 60 includes a locking metal plate 61, a bush 65 and a screw 67.

The locking metal plate 61 has a substantially square shape (see FIG. 2) and includes a knob 61A, a contact portion 61B and an engaging portion 61C. The knob 61A has a shape, for example, extending from the contact portion 61B so as to be inclined downward, and the knob 61A acts as a knob used when a user pivots the locking metal plate 61. The contact portion 61B keeps the holding plate 40 in the first state in a state in which the contact portion 61B is in contact with a back surface 41B of the bottom plate 41 of the holding plate 40. Accordingly, when the user rotates the locking metal plate 61 from a state illustrated in FIG. 3 by, for example, 180 degrees, the contact portion 61B becomes out of contact with the back surface 41B of the bottom plate 41 of the holding plate 40. As a result of this, the holding plate 40 pivots from the first state toward the second state under its own weight. An opening 61C1 is formed in the engaging portion 61C, and the engaging portion 61C engages the locking metal plate 61 to the bottom panel 31 of the outer housing 30 via the opening 61C1.

The bush 65 includes a tube portion 65A and a collar portion 65B formed continuously from the tube portion 65A. An outside diameter of the collar portion 65B is larger than an outside diameter of the tube portion 65A and is larger than a diameter of the opening 61C1. A through hole 65C through which a shank 67A of the screw 67 passes is formed in the tube portion 65A. It is noted that a diameter of the through hole 65C is smaller than an outside diameter of a head 67B of the screw 67. Conversely speaking, the outside diameter of the head 67B of the screw 67 is larger than the diameter of the through hole 65C. This is because it is necessary to sandwich and the bush 65 between the head 67B of the screw 67 and the bottom panel 31 of the outer housing 30 in contact with one another.

Moreover, the bush 65 has a length of the tube portion 65A in the up and down direction D2 larger than a thickness of the engaging portion 61C of the locking metal plate 61.

The screw 67 includes the shank 67A, the head 67B formed at a first end of the shank 67A and a thread portion 67C formed at a second end of the shank 67A. Each of outside diameters of the shank 67A and the thread portion 67C is smaller than the diameter of the through hole 65C of the tube portion 65A of the bush 65.

A screw hole 35 is formed at a position in the bottom panel 31 nearer to the panel 20 than to the rear panel 37. The tube portion 65A of the bush 65 is inserted into the opening 61C1 of the engaging portion 61C of the locking metal plate 61, and then the thread portion 67C is screwed into the screw hole 35 in a state in which the shank 67A and the thread portion 67C of the screw 67 pass through the through hole 65C of the bush 65. As a result of this, the locking metal plate 61 is fixed on the bottom panel 31 of the outer housing 30. At this point, a clearance 70 is produced between an upper surface of the collar portion 65B and a lower surface of the engaging portion 61C or between an upper surface of the engaging portion 61C and a lower surface of the bottom panel 31. This is because the length of the tube portion 65A of the bush 65 in the up and down direction D2 is larger than the thickness of the engaging portion 61C of the locking metal plate 61. It is noted that, in the embodiment in FIG. 5, the clearance 70 is produced between the upper surface of the collar portion 65B and the lower surface of the engaging portion 61C. This is because a force directed downward is applied to the locking metal plate 61.

The filter member 50 includes the filter 51 and a metal plate 52 accommodating the filter 51. The filter 51 is a dustproof filter and is shaped, for example, like a plate, and the metal plate 52 is shaped like a box opening upward. The filter 51 can be mounted in the metal plate 52 through the opening. The filter member 50 is configured such that the filter member 50 can be drawn out from the holding plate 40 for replacement in a state in which the holding plate 40 is in the second state. A grip 52A is formed on the filter member 50. Accordingly, it is easy to draw out the filter member 50 from the holding plate 40 by the grip 52A.

In the control apparatus 10 configured as described above, as illustrated in FIG. 5, the filter member 50 is inserted into the holding plate 40, and the holding plate 40 is locked by the locking member 60 such that the holding plate 40 is in the first state. In this case, a position of a front end portion of the back surface 41B of the bottom plate 41 of the holding plate 40 in height is lower than a position of the bottom panel 31 in height. In other words, in a state in which the filter member 50 is accommodated in a filter-accommodated space which is defined by the bottom panel 31 of the outer housing 30 and the holding plate 40 in the first state and the holding plate 40 is in the first state, the back surface 41B of the holding plate 40 is located outside of the bottom panel 31 of the outer housing 30, that is, is located below the bottom panel 31 of the outer housing 30. This is because a height of the filter member 50 is slightly higher than a height (depth) of the filter-accommodated space from the ceiling 33 of the recessed portion 31, that is, a height of the filter member 50 is slightly higher than a height (depth) of the space surrounded by the ceiling 33 of the recessed portion 32 and the holding plate 40 in the first state, and an upper surface of the filter member 50 is in tight contact with the ceiling 33 of the recessed portion 32. In other words, since a thickness of the filter member 50 is larger than a height of the left-side wall 42 and the right-side wall of the holding plate 40, the upper surface of the filter member 50 is in tight contact with the ceiling 33 of the recessed portion 32 in the state in which the filter member 50 is accommodated in the filter-accommodated space. The recessed portion 32 of the bottom plate 31 is configured such that the position of the front end portion of the back surface 41B of the bottom plate 41 of the holding plate 40 in height is lower than the position of the bottom panel 31 in height when the holding plate 40 is in the first state. Accordingly, in this case, a force by the own weight of each of the filter member 50 and the holding plate 40 and a reaction force of a force in which the upper surface of the filter member 50 pushes the ceiling 33 are applied to the contact portion 61B of the locking metal plate 61 of the locking member 60, so the locking metal plate 61 is further pushed downward. Regarding the forces applied to the contact portion 61B of the locking metal plate 61, since the locking metal plate 61 applies a reaction force, against the forces applied to the contact portion 61B, to the holding plate 40, the holding plate 40 is pushed upward by the reaction force from the contact portion 61B and the upper surface of the filter member 50 and the ceiling 33 of the recessed portion 32 becomes in much tighter contact with each other. As a result of this, it is possible to further prevent dust, lint and the like from entering into the outer housing 30 through the opening 33A of the ceiling 33.

Moreover, when the locking metal plate 61 is pushed downward, the clearance 70 is produced between the lower surface of the engaging portion 61C and the upper surface of the collar portion 65B of the bush 65. As a result of this, the locking metal plate 61 obliquely inclines downward, and the front end portion 41C of the bottom plate 41 of the holding plate 40 and the contact portion 61B of the locking metal plate 61 become in line contact with each other and the contact line extends in the right and left direction D3. Thus, because of the decrease of the area of contact between the holding plate 40 and the contact portion 61B, the resistance in the rotation of the locking metal plate 61 decreases. Accordingly, it is possible to easily rotate the locking metal plate 61. Further, since the diameter of the opening 61C1 of the engaging portion 61C of the locking metal plate 61 is larger than the outside diameter of the tube portion 65A of the bush 65, the friction resistance at the opening 61C1 applied from the tube portion 65A of the bush 65 in the rotation of the locking metal plate 61 decreases. As a result of this, it is possible to further easily to rotate the locking metal plate 61.

As described above, the control apparatus 10 of the present embodiment includes the outer housing 30 including the bottom panel 31 in which the opening 33A through which outside air is communicatable is formed, the holding plate 40 provided to the bottom panel 31 via the hinge 45 and pivotable between the first state at which the top surface 41A of the holding plate 40 is close to the bottom panel 31 and the second state at which the top surface 41A is spaced apart from the bottom panel 31, and the locking member 60 provided to the bottom panel 31 and configured to keep the holding plate 40 in the first state in a state in which the locking member 60 is in contact with the back surface 41B, which is opposite to the top surface 41A of the holding plate 40. The filter member 50 is attachably and detachably accommodated in the filter-accommodated space which is a space defined by the bottom panel 31 of the outer housing 30 and the holding plate 40 in the first state.

Moreover, the locking member 60 includes the locking metal plate 61 including the engaging portion 61C in which the opening 61C1 is formed and the contact portion 61B contactable with the back surface 41B of the holding plate 40, the bush 65 including the tube portion 65A having the through hole 65C and inserted in the opening 61C1 and the collar portion 65B formed continued from the tube portion 65A and contactable with the lower surface of the engaging portion 61C, wherein the tube portion 65A has the length larger than the thickness of the engaging portion 61C of the locking metal plate 61 and the collar portion 65B has the outside diameter larger than the outside diameter of the tube portion 65A, and the screw 67 including the shank 67A passing through the through hole 65C of the bush 65, the head 67B formed at at the first end of the shank 67A and having the outside diameter larger than the diameter of the through hole 65C, and the thread portion 67C formed at the second end of the shank 67A and fixed to the bottom panel 31 of the outer housing 30, and characterized in that the locking metal plate 61 is pivotablly supported so as to be povitable about the opening 61C1 in a state in which the engaging portion 61C is held between the collar portion 65B of the bush 65 and the bottom panel 31 of the outer housing 30. In other words, locking metal plate 61 is pivotally supported so as to be pivotable about the opening 61C1 in a state in which a first surface of the engaging portion 61C is spaced apart from the collar portion 65B of the bush 65 and a second surface of the engaging portion 61C is in contact with the bottom plate 31 of the outer housing 30.

Thus, in the control apparatus 10 of the present embodiment, since the locking metal plate 61 of the engaging portion 61C is moderately and loosely held between the collar portion 65B of the bush 65 and the bottom panel 31 of the outer housing 30, and the locking metal plate 61 is pivotally supported so as to be pivotable about the opening 61C1, it is possible to easily rotate the locking metal plate 61 when the lock is released by rotating the locking metal plate 61 of the locking member 60. Accordingly, it is possible to change the state of the holding plate 40 from the first state to the second state by easily rotating the locking metal plate 61, and it is possible to replace the locking member 60 without using tools.

It is noted that, in the present embodiment, the outer housing 30 is an example of a housing. The bottom panel 31 is an example of a first panel. The top surface 41A is an example of a first surface. The back surface 41B is an example of a second surface. The opening 33A is an example of an opening. The screw 67 is an example of a pin. The locking metal plate 61 is an example of a locking plate. The locking plate may be a member formed by a plate like member formed of resin in place of the locking metal plate 61.

Moreover, the outer housing 30 includes the panel 20 and the rear panel 37, and characterized in that the hinge 45 is disposed at the position nearer to the rear panel 37 than to the panel 20 in the bottom panel 31 so that the holding plate 40 is pivotable about an axis extending in the right and left direction D3 horizontally intersecting the front and rear direction D1. The panel 20 is an example of a front panel.

According to this, the user can draw out the filter member 50 from the space between the bottom panel 31 and the placement surface in a state in which the user faces the panel 20 when replacing the filter member 50.

Moreover, the locking member 60 is disposed at the position nearer to the panel 20 than to the holding plate 40 in the bottom panel 31 so as to be contactable with the front end portion 41C of the holding plate 40 which is nearer to the panel 20 than to the rear panel 37.

As a result of this, the user can operate the locking member 60 by entering his fingers into the space between the bottom panel 31 and the placement surface in the state in which the user faces the panel 20.

Moreover, the holding plate 40 is configured so that the filter member 50 is capable of access insertion to and access removal from the filter-accommodated space from a side of the panel 20 in the state in which the holding plate 40 is in the second state.

As a result of this, the user can replace the filter member 50 in the state in which the user faces the panel 20.

Moreover, the bottom panel 31 includes the recessed portion 32 recessed inward from the bottom panel 31 so as to contain the filter-accommodated space, and the screw 67 of the locking member 60 is fixed to a region other than the recessed portion 32 in the bottom panel 31.

As a result of this, since the filter member 50 does not go beyond the bottom panel 31 toward outside, it is possible to place the control apparatus 1 without concern for the filter member 50.

Moreover, the back surface 41B of the holding plate 40 is located at the position nearer to the outside of the housing 30, in a direction perpendicular to the bottom panel 31, than the position at which the screw 67 is fixed in the bottom panel 31 in a state in which the filter member 50 is accommodated in the filter-accommodated space so that the holding plate 40 is in the first state.

As a result of this, it is possible to bring the filter member 50 into tight contact with the ceiling 33 of the filter-accommodated space.

Moreover, the holding plate 40 is divided into a plurality of parts in the direction in which the axis of the hinge 45 extends and the plurality of parts of the holding plate 40 are independently and respectively pivotable between the first state and the second state.

As a result of this, it is possible to replace only one of the pair of filter members 50, 50.

While the embodiment has been described above, it is to be understood that the disclosure is not limited to the details of the illustrated embodiment, but may be embodied with various changes and modifications, which may occur to those skilled in the art, without departing from the spirit and scope of the disclosure.

The laser head is used as the external device to be controlled in the above described embodiment, however, it is not limited to this.

The LEDs are used as the plurality of indicators 23 in the above described embodiment, however, there are not limited to these. For example, a LED display device may be used, and characters and figures may be displayed on the LED display device.

The switches, indicators and various kinds of connecting terminals are provided on the panel 20 in the above described embodiment, however, any one of the switches, the indicators and the various kinds of connecting terminals may be omitted, and the panel 20 may be configured such that none of the switches, the indicators and the various kinds of connecting terminals are provided.

The two holding plates 40 are disposed in the recessed portion 32 in the above described embodiment, however, the number of the holding plates 40 is not limited to two. One, three or more holding plates may be used in the control apparatus 10.

What is claimed is:
1. A control apparatus, comprising:
 a housing including a first panel in which an opening through which outside air is communicatable is formed;

a holding plate provided to the first panel via a hinge and pivotable between a first state at which a first surface of the holding plate is close to the first panel and a second state at which the first surface is farther away from the first panel; and a locking member provided to the first panel and configured to keep the holding plate in the first state in a state in which the locking member is in contact with a second surface, which is opposite to the first surface, of the holding plate, wherein the holding plate is configured so that a filter-accommodated space, defined by the first panel of the housing and the holding plate in the first state, is capable of accommodating a filter member attachably and detachably, wherein the locking member includes:
   a locking plate including an engaging portion in which an opening is formed and a contact portion contactable with the second surface of the holding plate;
   a bush including a tube portion having a through hole and inserted in the opening, and a collar portion formed continuously around the tube portion and contactable with a first surface of the engaging portion, the tube portion having a length larger than a thickness of the engaging portion of the locking plate, the collar portion having an outside diameter larger than an outside diameter of the tube portion; and
   a pin including a shank passing through the through hole of the bush, a head formed at a first end of the shank and having an outside diameter larger than a diameter of the through hole, and a fixer formed at a second end of the shank and fixed to the first panel of the housing, and wherein the locking plate is pivotably supported so as to be pivotable about the opening in a state in which the engaging portion is held between the collar portion of the bush and the first panel of the housing.

2. The control apparatus according to claim 1,
wherein the first panel is a bottom panel of the housing, and
wherein the bottom panel includes a leg portion configured to contact with a placement surface.

3. The control apparatus according to claim 2,
wherein the housing includes a front panel and a rear panel, and
wherein the hinge is disposed at a position nearer to the rear panel than to the front panel in the bottom panel so that the holding plate is pivotable about an axis extending in a right and left direction horizontally intersecting a front and rear direction.

4. The control apparatus according to claim 3,
wherein the locking member is disposed at a position nearer to the front panel than to the holding plate in the first panel so as to be contactable with an end portion of the holding plate which is nearer to the front panel than to the rear panel.

5. The control apparatus according to claim 4,
wherein the holding plate is configured so that the filter member is capable of front access insertion to and front access removal from the filter-accommodated space in a state in which the holding plate is in the second state.

6. The control apparatus according to claim 3,
wherein the front panel includes an operational panel having a switch and an indicator.

7. The control apparatus according to claim 3,
wherein the front panel includes a terminal to which an external device is connectable.

8. The control apparatus according to claim 7,
wherein the terminal is connected to a laser light outputting device having a laser emitter, as the external device.

9. The control apparatus according to claim 1,
wherein the first panel includes a recessed portion recessed inward from the first panel so as to define the filter-accommodated space, and
wherein the pin of the locking member is fixed to a region other than the recessed portion in the first panel.

10. The control apparatus according to claim 9,
wherein the second surface of the holding plate is located at a position nearer to an outside of the housing, in a direction perpendicular to the first panel, than a position at which the pin is fixed in the first panel in a state in which filter member is accommodated in the filter-accommodated space so that the holding plate is in the first state.

11. The control apparatus according to claim 1,
wherein, in a state in which the filter member is accommodated in the filter-accommodated space and the holding plate is in the first state, the second surface of the holding plate is located outside of the first panel of the housing.

12. The control apparatus according to claim 1,
wherein the first panel is a bottom panel of the housing,
wherein, in a state in which the filter member is accommodated in the filter-accommodated space and the holding plate is in the first state, the second surface of the holding plate is located below a lower surface of the first panel of the housing.

13. The control apparatus according to claim 1,
wherein, in a state in which the filter member is accommodated in the filter-accommodated space and the holding plate is in the first state, the second surface of the holding plate is in contact with a first surface of the filter member and a second surface of the filter member is pressed against the first panel,
wherein the holding plate includes a side wall standing from the first surface of the holding plate, and
wherein a thickness of the filter member is larger than a height of the side wall.

14. The control apparatus according to claim 1,
wherein, in a state in which the filter member is accommodated in the filter-accommodated space and the holding plate is in the first state, a clearance between the bush and the contact portion of the locking plate is produced.

15. The control apparatus according to claim 1,
wherein the holding plate is divided into a plurality of parts in a direction in which the axis of the hinge extends, and the plurality of parts of the holding plate are independently and respectively pivotable between the first state and the second state.

* * * * *